United States Patent [19]

Colmon et al.

[11] Patent Number: 4,749,401

[45] Date of Patent: Jun. 7, 1988

[54] GLASS TEMPERING USING GAS

[75] Inventors: Daniel Colmon, Franconville; Bernard Letemps, Thourotte, both of France

[73] Assignee: Saint-Gobain Vitrage "Les Miroirs", Courbevoie, France

[21] Appl. No.: 90,396

[22] Filed: Aug. 27, 1987

Related U.S. Application Data

[63] Continuation of Ser. No. 868,531, May 30, 1986, abandoned.

[30] Foreign Application Priority Data

May 30, 1985 [FR] France ............................ 85 08096

[51] Int. Cl.⁴ ............................................. C03B 27/04
[52] U.S. Cl. ........................................ 65/114; 65/104; 65/348; 65/351
[58] Field of Search ................. 65/104, 114, 348, 351

[56] References Cited

U.S. PATENT DOCUMENTS

| 2,271,377 | 1/1942 | Monnet | 65/114 |
| 3,986,856 | 10/1976 | Fournier et al. | 65/114 |
| 4,578,102 | 3/1986 | Colmon et al. | 65/114 |

FOREIGN PATENT DOCUMENTS 2094290  9/1982  United Kingdom ................. 65/114

Primary Examiner—Arthur Kellogg
Attorney, Agent, or Firm—Oblon, Fisher, Spivak, McClelland & Maier

[57] ABSTRACT

In glass tempering using a cooling gas, the impact of gas jets on glass is modified through the use of perturbations to which said jets are subject. The perturbations may be introduced laterally with respect to the tempering jets, and spaced from the opening providing said tempering jets. The characteristics of the perturbations vary cyclically. The invention makes it possible to obtain homogeneous tempering, even for highly bulged glass sheets.

19 Claims, 3 Drawing Sheets

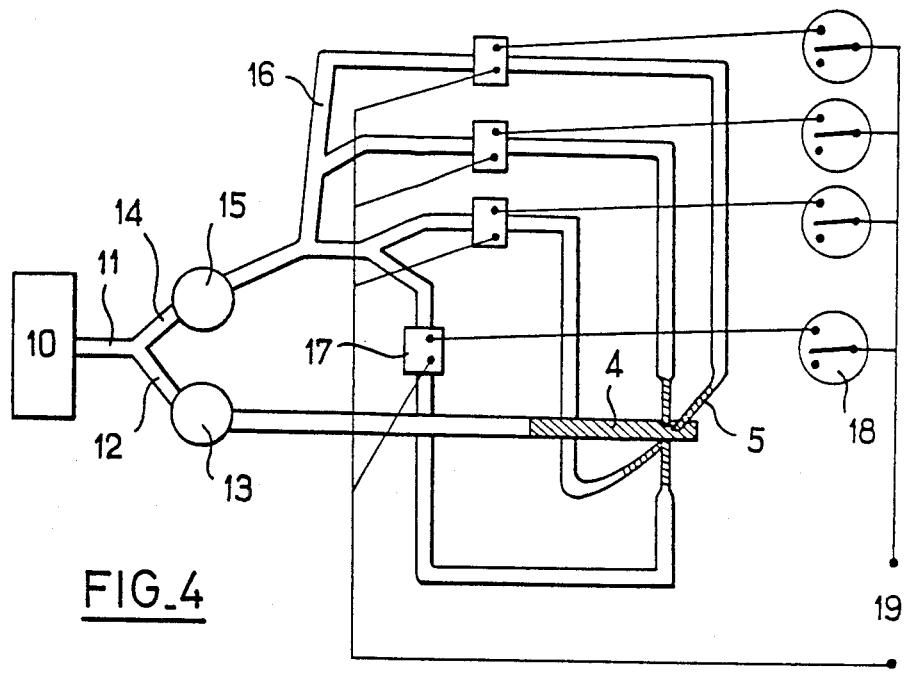
FIG_4
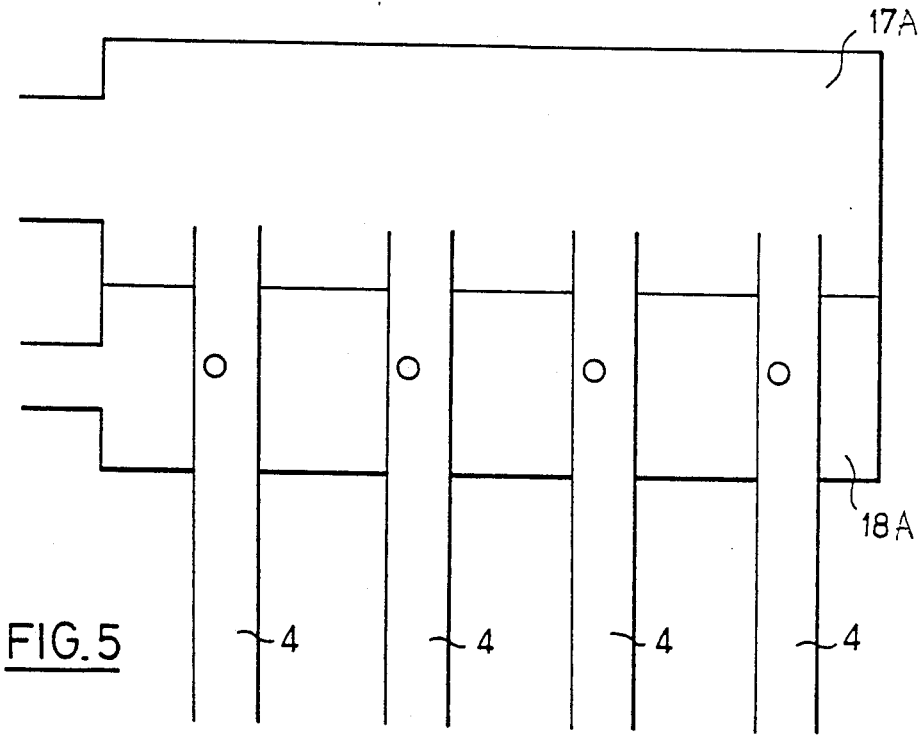
FIG.5

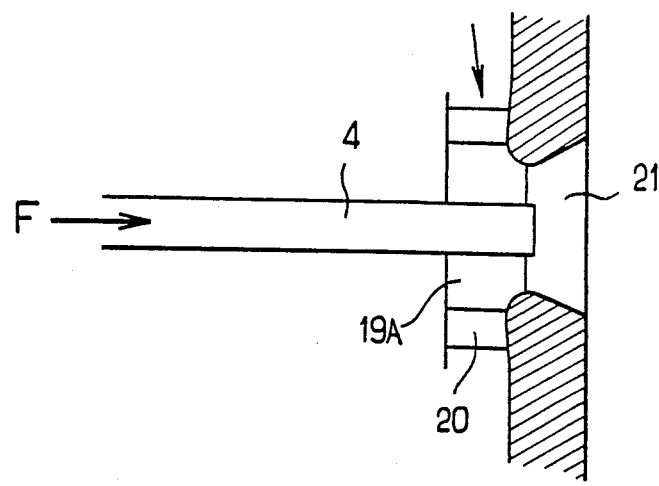
FIG_6
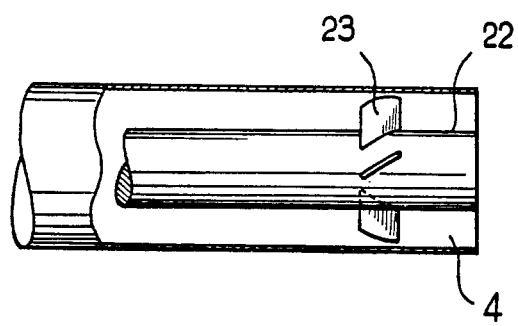
FIG_7

GLASS TEMPERING USING GAS

This application is a continuation of application Ser. No. 868,531 filed on May 30, 1986 now abandoned.

BACKGROUND OF THE INVENTION

1. Field of the Invention:

This invention pertains to the tempering of glass using gaseous jets of a cooling fluid which usually consists of air.

2. Description of the Related Art

It is known that, for obtaining mark-free tempering of glass sheets by blowing a cooling gas thereon, said glass sheets and blowing elements should be shifted with respect to each other.

In the case of horizontal tempering, i.e., when the glass sheets are arranged horizontally, the blowing elements are generally stationary, while the glass sheets move; in the case of vertical tempering, there can be an oscillation of both blowing elements and glass sheets.

This relative shift of glass and blowing elements is mentioned especially in French Patent. Nos. 2,547,575; 1,133,039; 1,158,738; 1,476,785.

Under such conditions, it is possible to temper slightly bulged glass sheets, but when glass volumes which are highly convex and/or which have multiple curvatures in different directions, such as half-spheres, are involved, any relative movement of the glass sheets and the blowing elements with respect to each other is impossible, except by moving the glass sheets and the blowing elements far apart. But, in that case, the necessary blowing pressures become too high and the space between the glass and the blowing means fluctuates too much for the tempering to be homogeneous.

Moreover, any shift, either of glass or of blowing elements, can take place only with a relatively low frequency, whereas the quality of the tempering increases with the frequency of the relative shift of glass and blowing elements.

It has already been proposed, in an attempt to resolve the problem of the frequency of the relative shift of glass and blowing elements, to lighten the blowing elements that are made to oscillate and to instead set only the blowing nozzles into oscillation (French Patent No. 1,550,733). But there still remains a movement of mechanical elements which limits the frequency of the oscillations. Moreover, the impossibility of the relative movement of glass and of blowing elements with respect to one another for highly bulged glass sheets and those having multiple curvatures has not been resolved.

It was also proposed in French Patent No. 83-4514 to vary, during the cooling of the glass for the purpose of tempering it, either the position of the cooling zones or their active intensity, or both, by causing two or more jets, whose flow was altered in relation to time, to interact as they issue from their respective nozzles. This would seem to be a possible solution for the problems presented by the movements of the blowing elements and/or the oscillations of glass sheets opposite these means; however, this is not the case.

Indeed, the multiplication of the number of nozzles in order to obtain an interaction of the jets issuing therefrom creates an obstacle which hinders the escape of tempering air and which thus significantly reduces its efficiency. In addition, this technique requires special blowing elements, tuyere in this case, and significant flows and pressures for each of these nozzles, resulting in relatively high equipment and operating costs.

SUMMARY OF THE INVENTION

The object of this invention is to provide a means to shift the position of gaseous fluid jets blown on glass sheets at a high frequency, without causing collisions between the glass and the blowing elements that are supplying those jets, particularly when the glass sheets are deeply convex with multiple curvatures, without constricting the paths for escape of the gaseous fluid after it has been blown on the glass and without introducing prohibitive costs.

A further object of the invention is to allow easy modifications of the blowing unit when one wishes to change the tempering conditions or when the shape of the glass sheets varies.

To do so, the invention permits achieving a rapid shift of the jets without moving any mechanical elements, blowing nozzles or chambers which produce them while blowing a gaseous cooling fluid on the glass, which is distributed in jets. An impact characteristic of the jets; on the glass, other than the volume of gas from the jets impacting on the glass, is modified cyclically by subjecting each jet to modified perturbations, before it is released.

According to a first embodiment, these perturbations are providing by at least one secondary gaseous control current which interferes with the cooling fluid intended to form each jet and whose interference with said jet is modified cyclically.

In certain cases, the secondary gaseous control current is a current which is lateral and radial in relation to the axis of the cooling fluid intended to form each jet. In other cases, this secondary gaseous control current is lateral and tangential in relation to the axis of the cooling fluid intended to form each jet. In still other cases, at least one secondary gaseous control current of each type, i.e., radial and tangential, is associated with a jet of cooling fluid.

To the extent that several secondary gaseous currents are associated with the same jet of cooling fluid, said secondary gaseous currents are activated to interfere with the jet of cooling fluid, individually one after the other, or in groups, the various groups acting one after the other.

In a second embodiment, blade-type mechanical obstacles are positioned in the path of the cooling fluid before it is released, which forces this fluid to rotate. The pressure of that fluid which is to form the jet is also cyclically varied.

The invention also proposes devices to implement the process for allowing the impact of a tempering jet or jets on glass to be modified, as described above.

BRIEF DESCRIPTION OF THE DRAWINGS

FIGS. 2A to 2C are views of a tubular blowing nozzle controlled by radial gaseous currents, in which FIG. 2A is a profile view, FIG. 2B is an overhead view, and FIG. 2C is a perspective view with illustration of the impact on the glass;

FIGS. 3A to 3C are views of a tubular blowing nozzle controlled by tangential gas current, in which FIG. 3A is a profile view, FIG. 3B is an overhead view, and FIG. 3C is a perspective view with illustration of the impact on the glass;

FIG. 4 is a schematic view illustrating the operation of a nozzle controlled by radial or tangential currents which vary cyclically;

FIG. 5 is a schematic view of of the simultaneous feed and control of the entire series of nozzles, with each nozzle receiving multiple radial and/or tangential gaseous currents;

FIG. 6 is view of the mechanical obstacles inserted in the path of the secondary gaseous currents in order to perturb the main jet so as to obtain a cyclically variable impact;

FIG. 7 is a view of mechanical obstacles placed on the path of the main jet in order to perturb it to produce a cyclically variable jet.

DETAILED DESCRIPTION OF THE PREFERRED EMBODIMENTS

Figure 1:
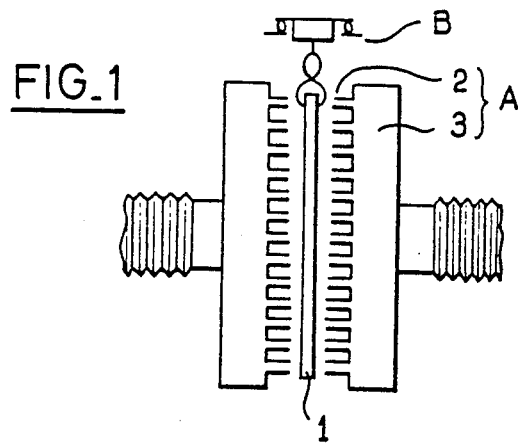
FIG. 1 is a schematic view of an installation in which glass is tempered by the blowing of a gaseous fluid.

As is known, a tempering installation for glass sheets 1 includes blowing organs A formed as nozzles 2 which may be tubular for example, chambers 3 to feed these nozzles 2 with pressurized gas, typically air, and means B to maintain, support and/or cause the glass sheets 1 opposite the nozzles 2 to move.

To blow the tempering gas onto the glass, the invention proposes in a first embodiment using the type of nozzles shown in FIGS. 2 and 3. As there seen, the nozzles each have a main tube 4 and at least one lateral conduit 5 (for example four) communicating with the tube 4 at a distance from its gas discharge end. The tube 4 is fed with pressurized gas in a direction F. The lateral conduits are also fed with pressurized gas and the secondary jets formed by the pressurized gas conveyed by each lateral conduit 5 interferes with the fluid intended to form the main jet and transported by the main tube 4. The secondary jets may be used to control the main jet, i.e., to modify its orientation and/or its impact on the glass.

Figure 2A:
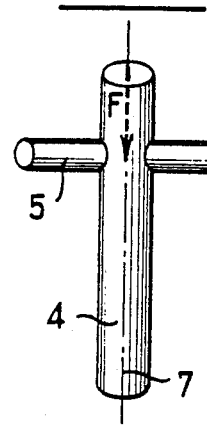
Figure 2B:
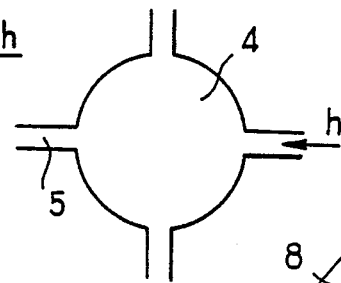
Figure 2C:
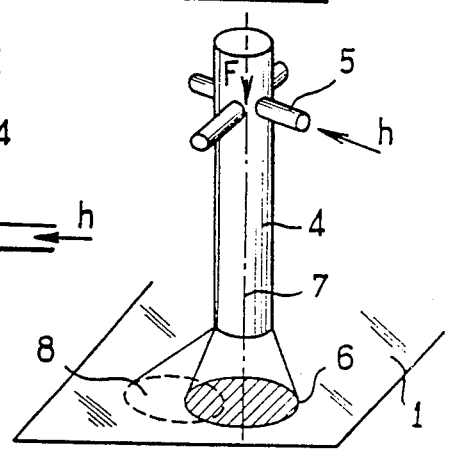

The lateral conduits 5 can be radial, as shown in FIGS. 2A–2C. If there are four of them per main tube 4, they may be placed 90 degrees apart from one another. They may also intersect main tube 4 tangentially as shown in the FIGS. 3A–3C and, for example, be equally placed 90 degrees apart from one another.

When the main jet is fed, in the absence of a secondary control jet, it produces an impact area 6 on the glass, centered on axis 7 of main tube 4 and of the main jet which it delivers. When at least one lateral conduit 5 is fed with a secondary gas current, the two gaseous flows combine so that the resulting jet is deflected and its impact on the glass is different from that in the absence of the secondary current. Thus, for example, in the case of radial lateral conduits 5 as illustrated in the FIGS. 2A–2C, when a gas current is sent into the main tube 4 along direction F and into one of the lateral conduits along direction h, the impact area 8 of the combined jet on the glass is shifted in relation to the impact area 6 obtained in the absence of the secondary jet, in the direction h as shown in FIG. 2C.

Figure 3A:
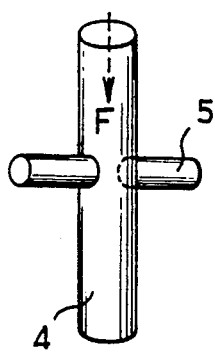
Figure 3B:
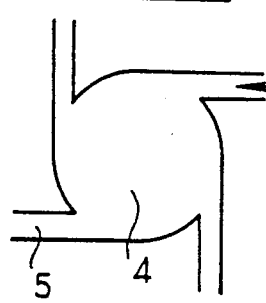
Figure 3C:
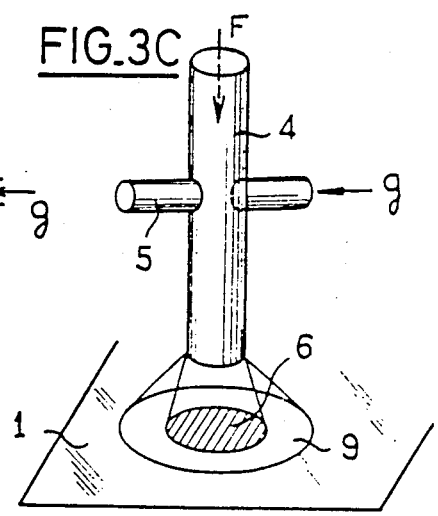

In the case of tangential lateral conduits 5 illustrated in the FIGS. 3A–3C, when a gas current is sent into the main tube 4 along direction F and into at least one of the lateral tangential conduits along direction g, the impact 9 of the combined jet on the glass 1 is more spread out than the impact 6 obtained in the absence of the secondary jet (FIG. 3C), the spreading being a result of the centrifugal force imparted on the jet by the tangential secondary jets.

Several lateral conduits 5, whether radial or tangential, can be fed simultaneously; the impact of the combined jet on the glass is determined by the sum of the jets, which is an axial flow due to the main jet and lateral (radial or tangential) flow due to the secondary jets.

Also, several lateral conduits 5, some of which are radial and others tangential, can be connected to the same main tube 4, the lateral conduits 5 being fed successively, or several of them fed simultaneously. To the extent that radial and tangential conduits are fed simultaneously, the impact on the glass is not only offset, but also enlarged with respect to the impact of a main jet alone.

The lateral conduits lead preferably into a rectilinear part of the main tube 4, so as not to alter or complicate the effect of the secondary jets by superimposing it with parasitic effects due to a curving of the main tube 4. Also preferably, these lateral conduits 5 lead into the main tube sufficiently close to its outlet so that the effect of the secondary jets is not exhausted upon leaving the main tube 4. The effect of the secondary jets will be increasingly felt, all things being equal, the closer the connection of the lateral conduits is to the outlet of the main tube 4. A secondary jet will have increasingly marked effects as its impulse (pressure, flow rate or volume) increases, compared to that of the main jet. The impulse will depend on the source of pressurized gas, generally air, the section of the secondary conduits and the calibration of any pressure reducing valve mounted in the secondary conduits.

The cyclical perturbation of the main jet introduced by the secondary jets can be effected as illustrated in FIG. 4, in which four lateral conduits 5 are connected to the same main tube 4.

FIG. 4 shows a main tube 4 having a nozzle for tempering the glass, with this main tube 4 accommodating four secondary lateral conduits 5, near its outlet end. This unit is fed with compressed air by a single compressed air source 10, with the pipe 11 issuing from said source being subdivided so as to feed the main tube 4 as well as the four lateral conduits 5.

Following the first subdivision, a section 12 of the subdivided pipe 11, equipped with a pressure reducing valve 13, is connected to the main tube 4, while a second section 14 which is also equipped with a pressure reducing device 15 subdivides again several times to produce four branches such as 16, with each being equipped with an electrical valve 17, to feed the four lateral conduits 5. The opening and closing of each electrical valve 17 is controlled by a motor moving a camshaft (not shown), the cams acting on electrical micro-contacts such as 18, which regulate the distribution of the electric current coming from the electrical source 19 through the contacts 18 and which consequently regulate the operation of the electrical valves 17.

The perturbations to which the main jet is subjected by the secondary lateral jets can be equivalent or different from one another. The secondary jets can be differentiated by acting on the cross section of each branch 16 by the adjustment of the electrical valve 17, the opening duration for the electrical valves 17 as determined by the opening angle of the cam associated with it, the position with respect to the outlet end of the main tube 4 at which opens each lateral conduit 5, or the manner in which each lateral conduit 5 opens into tube 4, i.e., radial or tangential (in general, the angle with respect to the main jet).

To the extent that all secondary currents are to be equal, one can further modulate the perturbation brought by each secondary current by acting on the relative calibration of the two pressure reducing valves 13 and 15, on the cross of the section 12 and branches 16 of the pipe 11, on the time, the order, the degree and delay of the opening of the electrical valves, on the number of lateral conduits 5 and on the arrangement thereof with respect to the main tube 4.

To feed each nozzle of a main jet and with secondary currents, one can operate by forming pipes 11, sections 12 and branches 16 from flexible plastic tubes. However, when in a tempering station, there is a large number of nozzles, it can be preferable to use the method of feeding the main tubes 4 and the lateral conduits 5 as described below in relation to FIG. 5.

All of the main tubes 4 to be fed are identical and stem from a single chamber 17A fed with pressurized gas, typically air. They next pass through one or a succession of other secondary chambers such as 18A, for secondary the current feed, with the number of secondary chambers being equal to the number of independently operable lateral conduits 5, provided for each blowing nozzle.

Thus, assuming that one wishes to subject the main jets to four successive perturbations using four different independently controllable, lateral secondary currents, four successive secondary chambers 18A will be provided.

Each secondary chamber 18A is connected to all of the lateral conduits 5 of each blowing nozzle which are intended to be fed simultaneously and under the same conditions. The feed for each secondary chamber 18A is adjusted through the use of a unit having the aforementioned electrical valve, micro-contact, and cam mounted on a shaft run by a motor, this unit not being shown in FIG. 5.

All of the secondary conduits can be fed by the above described system of chambers with a cyclical feed sequence, or the feed for the conduits can be combined among the various groups of secondary conduits 5; i.e., a group comprising conduits intended to be fed at the same time and under the same conditions can be fed in a manner different from that in which another group is fed. Thus, for certain groups, the chamber system will be used; for others, on the contrary, the flexible tube system will be maintained. In addition, in each group, the feed can also be combined.

The perturbation of the main jet was described as coming from the secondary currents carried by separate lateral conduits 5, either radially or tangentially. It is also possible to produce tangential secondary currents by cyclically feeding not separate conduits 5, but, as shown in FIG. 6, an entire chamber 19A arranged in a ring around the main tube 4, this chamber 19A being equipped with several non-radial flaps or deflecting blades 20. The secondary currents arriving laterally in relation to the main jet in the chamber 19A are oriented by the blades 20 and transformed into a vortex tangential to the main jet, with the vortex and the main jet interfering in the space 21 at the outlet of the tube 4.

This lateral feed for the chamber 19A can be cyclical and, this case, when it is provided, produces a turning jet which fans out at the outlet of the space 21, to a greater degree than in the absence of said lateral feed.

The amplitude lateral feed can vary cyclically, but there can also be a cyclical modulation of the pressure, the flow or the speed of the gaseous current constituting this lateral feed.

It is also possible to obtain a jet whose impact on the glass varies cyclically, by placing inclined blade-shaped obstacles 23 on the path of the main jet circulating in the tube 4, as shown in FIG. 7, the obstacles being mounted on the wall of a tube 22, inside the tube 4.

The pressurized gas sent into the main tube 4 encounters these blades, forms a vortex and fans out upon leaving the main tube 4. In this case, a secondary current is no longer necessary, since the reaction of the gas of the main jet on the obstacles alone produces the vortex effect.

By causing the cyclical variation in the pressure, speed and/or flow rate of the main jet distributed in the main tube 4, the speed of the vortex is modified, and the fanning out of the jet upon leaving the tube 4 is thus modified.

As a result, without mechanical movement, jets of cooling gas are produced, whose impact on the glass can be caried at high rates, which allows the yield of the tempering to be increased. This can affect the position and shape of the impact on the impact surface. This technique can be applied in horizontal or vertical tempering and can also be combined with the movements known in prior art: i.e., oscillations, movement of the glass and/or the chambers in relation to one another.

Because of the simple form of the nozzles—simple tubes are sufficient—materials costs are low.

This technique allows the production of tempered glass sheets which are highly convex, for which any movement of the glass and/or the blowing means in relation to one another is impossible due to the high degree of curving of the sheets.

Because of the delivery of each jet of cooling fluid by a single nozzle, the obstruction of the area surrounding the glass is reduced; the result of this is a significant improvement in the path for the escape of the tempering fluid after it encounters the glass, thus a high tempering yield.

Obviously, numerous modifications and variations of the present invention are possible in light of the above teachings. It is therefore to be understood that within the scope of the appended claims, the invention may be practiced otherwise than as specifically described herein.

What is claimed as new and desired to be served by Letters Patent of the United States is:

1. A process for tempering glass sheets, comprising the steps of:
    discharging all of a main gas jet of a cooling fluid from at least one discharge means in a direction having a component directed toward a glass sheet such that said main gas jet impinges on said glass sheet; and
    cyclically subjecting each said main gas jet, at a point upstream from said discharge means, to at least one flow perturbation in such a manner that an impact characteristic of said main gas jet on said glass sheet is cyclically modified while continuing to discharge all of said at least one main gas jet in said direction and from said discharge means, and continuing to impinge said main gas jet on said glass sheet.

2. The process of claim 1 wherein said step of cyclically subjecting comprises cyclically applying at least one secondary gaseous control current to each said main gas jet in such a way that the flow of said main gas jet is altered without substantially altering the flow volume of said main gas jet impinging on said glass sheet.

3. The process of claim 2 wherein each said secondary current flows transverse to said direction and radial to an axis of said main gas jet.

4. The process of claim 2 wherein each said secondary current flows transverse to said direction and tangential to an axis of said main gas jet.

5. The process of claim 2 wherein said at least one secondary current comprises at least two groups of said secondary currents, said groups being applied successively.

6. The process of claim 4 wherein said at least one secondary current comprises at least two groups of said secondary currents, said groups being applied successively.

7. The process of claim 2 wherein said step of cyclically applying at least one secondary gaseous current comprises the steps of:
cyclically directing said secondary current towards said main gas jet; and
positioning at least one flow altering obstacle in the path of said secondary current.

8. The process of claim 1 wherein said step of cyclically subjecting comprises the steps of:
cyclically directing a main gas current towards said discharge means; and
positioning at least one flow altering obstacle in the path of said main gas current.

9. An apparatus for tempering glass sheets, comprising:
at least one main conduit means for discharging all of a main gas jet of a cooling fluid from an outlet thereof and in a flow direction having a component directed toward a glass sheet such that said main gas jet impinges on said sheet;
at least one lateral conduit means communicating with each said main conduit means at a point upstream from said outlet in said flow direction, said main conduit means being unbranched downstream from said lateral conduit means;
means for supplying a gaseous current through said at least one lateral conduit means for interfering with said cooling fluid flowing through said main conduit means; and
means for cyclically varying said gaseous current in such a manner that an impact characteristic other than flow volume of said main gas jet on said glass sheet is cyclically modified.

10. The apparatus of claim 9 wherein at least one of said lateral conduit means radially intersects said main conduit means.

11. The apparatus of claim 9 wherein at least one of said lateral conduit means tangentially intersects said main conduit means.

12. The apparatus of claim 9 comprising four of said lateral conduit means.

13. The apparatus of claim 9 wherein said means for supplying comprises:
a source of pressurized gas connected to each said lateral conduit means;
an electrical valve positioned between said source and each said lateral conduit means; and
a motor driven cam means for operating each said valve.

14. The apparatus of claim 9 wherein said means for supplying comprises:
a plurality of chambers;
means for independently cyclically varying the pressure in each of said chamber; and
means for connecting at least one of said lateral conduit means to each of said chambers.

15. The apparatus of claim 14 wherein said means for independently cyclically varying comprise:
an electrical valve positioned between each said chamber and said lateral conduit means; and
a motor driven cam means for operating each said valve.

16. The apparatus of claim 9 including at least one flow altering blade in each said lateral conduit means.

17. The apparatus of claim 9 wherein said main conduit means is straight at said point.

18. The apparatus of claim 9 wherein said lateral conduit means are communicated with each said main conduit means at a point sufficiently close to said outlet that an effect of said gaseous current on said main gas jet is not exhausted at said outlet.

19. The method of claim 1 wherein said point is sufficiently close to said discharge means that the effect of said flow perturbation is not exhausted at said discharge means.

* * * * *